United States Patent
Krausser

[15] 3,652,914
[45] Mar. 28, 1972

[54] VARIABLE DIRECT VOLTAGE MEMORY CIRCUIT

[72] Inventor: Friedrich Johann Krausser, Jericho, N.Y.
[73] Assignee: Emerson Electric Co., St. Louis, Mo.
[22] Filed: Nov. 9, 1970
[21] Appl. No.: 87,901

[52] U.S. Cl..............................320/1, 307/109, 340/173 CA
[51] Int. Cl.........................................................G11c 11/24
[58] Field of Search..................320/1; 307/109; 340/173 CA

[56] References Cited

UNITED STATES PATENTS 3,141,124   7/1964   Atherton ....................................320/1
3,248,605   4/1966   Tomkinson ...........................320/1 X
3,576,571   4/1971   Booher...........................340/173 CA Primary Examiner—Bernard Konick
Assistant Examiner—Stuart Hecker
Attorney—Darby & Darby

[57] ABSTRACT

A variable direct-voltage memory circuit comprises a storage capacitor which can be connected in parallel by a switch with a reference capacitor having an extremely long time constant. When the switch is open, the difference in voltage between these two capacitors can be determined and used to control a shunt current regulator to regulate the flow of current to the storage capacitor.

2 Claims, 1 Drawing Figure

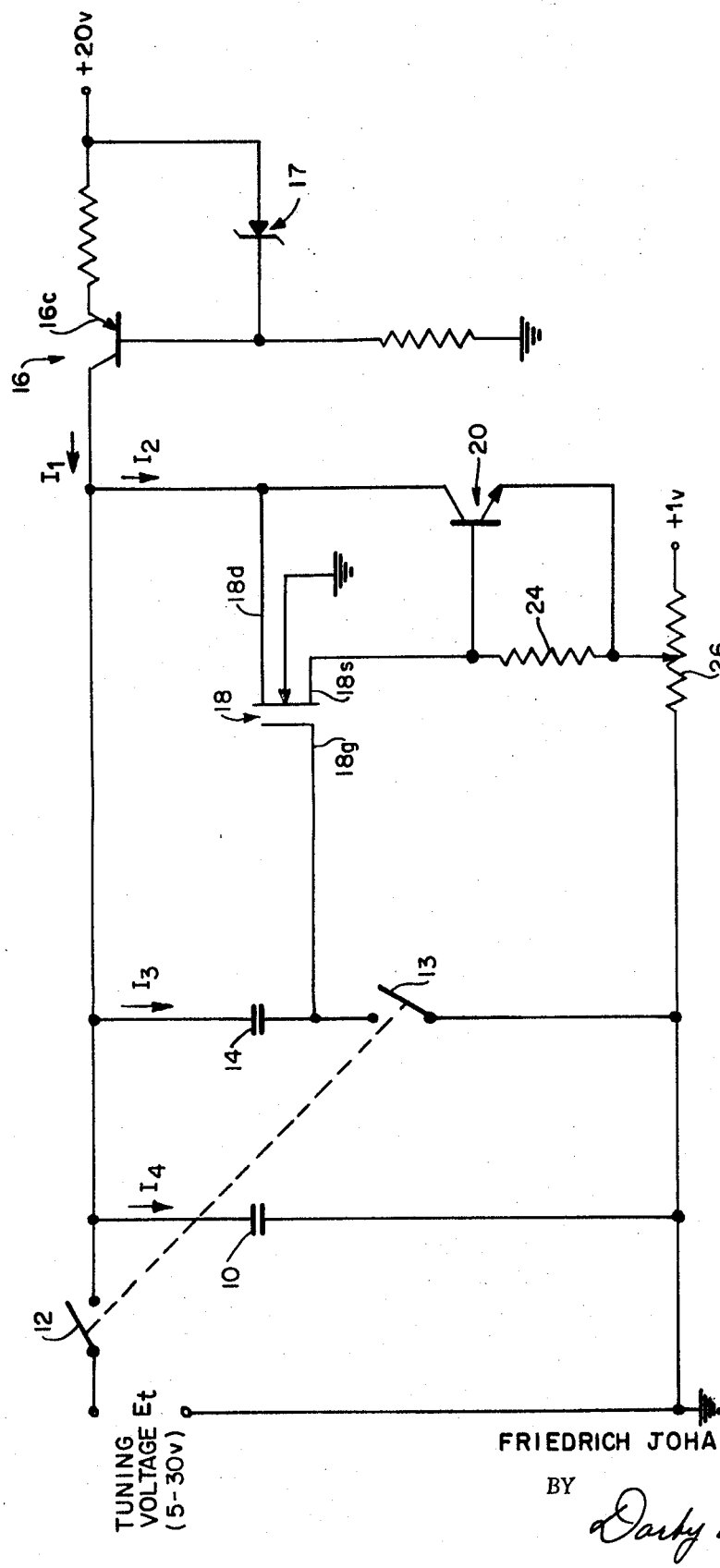

3,652,914

VARIABLE DIRECT VOLTAGE MEMORY CIRCUIT

The present invention relates to a variable direct-voltage memory circuit of the type which can be used with electronic tuning devices.

There are many different systems in which variable direct-voltage memory circuits have utility. For example, commercial radio receivers are frequently tuned by voltage variable capacitors (varactors) which are responsive to a variable direct-voltage. If a desired voltage can be stored for an extended period of time, it can be used to tune the receiver to the station corresponding to that particular voltage for so long as the voltage is stored. Variable direct-voltage memory circuits may also be used with analog computers, variable-speed motor controls, variable-speed "highway" automobile controls (the variable voltage representing a corresponding speed for the automobile), and in many other systems.

A variable-voltage memory circuit desirably should be able to store a voltage for an indefinite time period with no change in voltage. For purposes of the present invention, a voltage memory circuit is deemed to be of practical utility if it is capable of storing a voltage for a period of 200 hours with a voltage variation of less than 5 per cent. The voltage to be stored must be variable over a specific voltage range which, typically, may be from 3 to 30 volts.

Capacitor memory circuits have been built with long time constants and they are capable of meeting the above constraints. However, with known prior art circuits of this type, the voltage can only be read from the storage capacitor once, since after the capacitor has been discharged, the memory circuit is destroyed. The present invention provides a variable direct-voltage memory circuit employing a capacitor having a long time constant in which the readout is nondestructive, i.e., the voltage is retained for subsequent readout. This feature greatly increases the utility of the device since it is not limited to situations where the stored voltage may be read only once.

Further, in accordance with the invention, means are provided for regulating the stored voltage so that in the event of undesired supply voltage disturbances, the output voltage of the memory circuit will remain at the desired reference level originally stored in the circuit.

Briefly, in accordance with the invention, a storage capacitor with a shunt current regulator can be connected in parallel with a reference capacitor by a switch. The shunt current regulator includes a semiconductor control element having a high input impedance and can be removed from the circuit by the switch. The regulator is connected in such a way that the time constant for the reference capacitor is determined by its capacitance, its leakage resistance and this high input impedance. Consequently, this time constant may be equal to 200 hours or more. The shunt regulator provides a supply of current to the storage capacitor which compensates for any leakage of charge from the storage capacitor during use. It also serves to recharge the storage capacitor after the stored voltage has been read from it. The shunt regulator is controlled by the voltage difference between the reference capacitor and the storage capacitor.

The invention is described in further detail below with reference to the drawing, which is a schematic diagram of a preferred embodiment of the invention.

In the drawing, the storage capacitor is shown at 10. This capacitor must be capable of storing a voltage which may range, say, from 5 to 30 volts. Desirably, this voltage should be stored for the longest possible time period, at least in the order of 200 hours. The variable voltage source is connected across capacitor 10 and may, for example, be a variable voltage $E_t$ used to tune a radio receiver as described above. A push-button switch 12 may be used to connect capacitor 10 to the variable voltage source when it is desired to store a particular voltage. Switch 12 is ganged with a reset switch 13 for purposes described below.

In accordance with the invention, current is fed to capacitor 10 to compensate for the current which would normally leak from this capacitor during an extended interval. The means for providing this current includes a reference capacitor 14, a transistor 16 which is biased by a zener diode 17 to serve as a constant current source, and a shunt current regulator comprising a standard metal-oxide-semiconductor field effect transistor 18 (MOSFET) and a PNP-transistor 20.

The gate electrode 18g of field effect transistor 18 is coupled to the side of reference capacitor 14 opposite its junction with storage capacitor 10. The source electrode 18s is connected to the base 20b of transistor 20 which in turn is coupled through a resistor 24 to a variable bias adjustment resistor 26. As is known, as the gate electrode 18g goes positive with respect to the source electrode 18s, the current flow from the drain to source electrodes increases. As the gate goes negative, current decreases.

The time constant of the reference capacitor 14 is determined by its capacitance, its leakage resistance, and the leakage resistance of the field effect transistor 18. Since these values may be extremely high, it is theoretically possible that this time constant may be in the order of 380 days or even more.

The collector 16c of constant current source 16 is coupled to the positive side of a power supply (not shown) so that a steady-state current $I_1$ is produced. The current $I_1$ from source 16 branches into three currents, $I_2$, $I_3$ and $I_4$, through the shunt regulator, reference capacitor 14 and storage capacitor 10, respectively. If the current $I_4$ can be made to compensate for the charge which leaks from the storage capacitor 10, then the voltage across capacitor 10 will remain constant for an indeterminate time, so long as current $I_4$ is available. $I_4$ can be controlled by varying $I_2$, and, for this purpose, the wiper arm of the bias adjustment resistor 26 is adjusted (thus varying current flow through transistor 20) until there is no change in voltage across capacitor 10 for a substantial period of time. Thereafter, as described below, the circuit can be used to store a variable voltage, which may be used as often as desired, for a period of time determined by the product of the capacitance of the reference capacitor 14 and the input impedance of field effect transistor 18.

After the above bias adjustment has been completed, it may be desired to store a tuning voltage $E_t$, which typically might vary between 5 and 30 volts, on the storage capacitor 10. This voltage will be available at the input terminals, so that when the user actuates switches 12 and 13 the voltage $E_t$ is applied across both capacitors 10 and 14. When the switches 12 and 13 are opened, this voltage is stored in both capacitors. The current $I_4$ maintains the voltage across capacitor 10 constant while the long time constant of capacitor 14 prevents its discharge.

Thereafter, if for any purpose the voltage across capacitor 10 changes, the circuit will return it to its original stored value. For example, assume that the voltage across capacitor 10 drops significantly because the stored voltage is being used to tune a receiver. When this occurs, since switch 13 is open, the voltage on the MOSFET gate 18g will drop below ground (the voltage across capacitor 14 remaining constant) and the current flow through FET 18 (and resistor 24) will be reduced. This will lower the positive voltage applied to the base of transistor 20, also reducing the current through this transistor. Consequently, the current $I_2$ will be reduced, and, since $I_1$ is constant, current $I_4$ must necessarily be increased. This recharges storage capacitor 10. Capacitor 10 will continue to be charged until the voltage across it is equal to the voltage across reference capacitor 14, at which point the shunt transistors 18 and 20 return to their original conducting states where $I_4$ is only sufficient to maintain the charge on capacitor 10.

In a similar fashion, if for some reason the voltage across storage capacitor 10 should increase, the resultant voltage difference between the voltages across capacitors 10 and 14 will cause an increase in conduction through transistors 18 and 20. This will reduce the current $I_4$ fed to capacitor 10 until the voltage across capacitor 10 is equal to the desired voltage across capacitor 14.

The operation of the circuit is the same regardless of the reason for the change in voltage across capacitor 10. Also, if the constant current flow $I_1$ is temporarily interrupted, upon resumption of the current flow, the storage capacitor 10 will be immediately charged to the voltage stored in reference capacitor 14.

If it is desired to change the voltage to be stored, the variable voltage source is connected across capacitor 10 by closing switches 12 and 13. Thereafter, any voltage $E_t$ can be stored in storage capacitor 10 and reference capacitor 14, with the shunt regulator maintaining the output voltage at the new desired level and permitting limitless readout of the stored voltage.

What is claimed is:

1. A variable direct-voltage memory circuit, comprising
   a storage capacitor,
   a reference capacitor,
   a switch for connecting said reference capacitor in parallel with said storage capacitor,
   means for applying a current to a junction of said reference and storage capacitors, and
   a shunt current regulator connected in parallel with said reference capacitor and storage capacitor, said shunt regulator including a solid-state control element having at least one control electrode and two current conducting electrodes, with the flow of current between said current conducting electrodes being determined by the voltage applied to said control electrode, said control electrode being connected to said reference capacitor and providing a high impedance which determines the discharge time for said reference capacitor, one of said current electrodes of said control element being connected to the junction of said reference and storage capacitors so that when said switch is open, a difference between the voltages across said reference and storage capacitors will vary the current flow through said shunt regulator so as to return the voltage across the storage capacitor to the voltage across the reference capacitor.

2. A memory circuit according to claim 1, wherein said shunt regulator includes a second solid-state control element having at least one control electrode and two current conducting electrodes, said current conducting electrodes being connected across said storage capacitor, the voltage applied to said control electrode being responsive to current flow through said first-named control element.

* * * * *